Inventor:
Horst Schibisch
Craig & Antonelli
ATTORNEYS

April 7, 1970   H. SCHIBISCH   3,504,644
BULLETPROOF GRATING FOR ARMORED VEHICLE AIR
INTAKE AND DISCHARGE OPENINGS
Filed Jan. 10, 1968   2 Sheets-Sheet 2
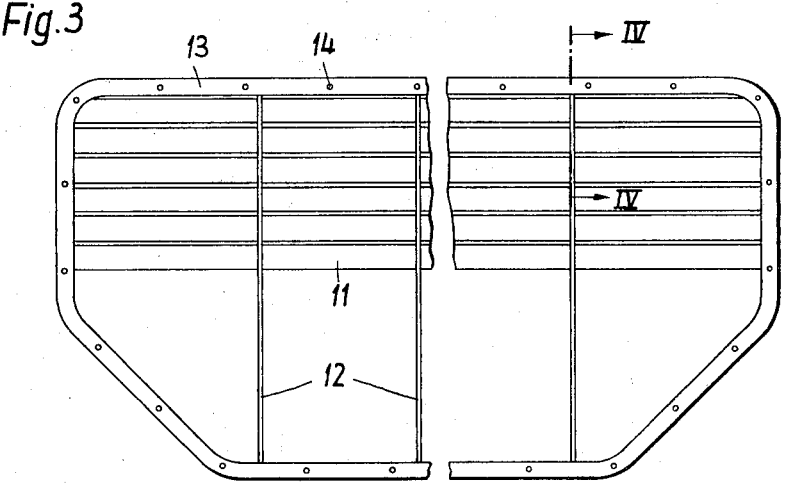
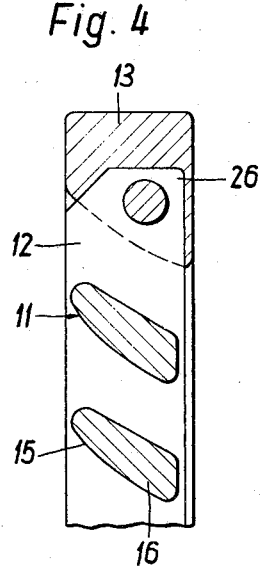
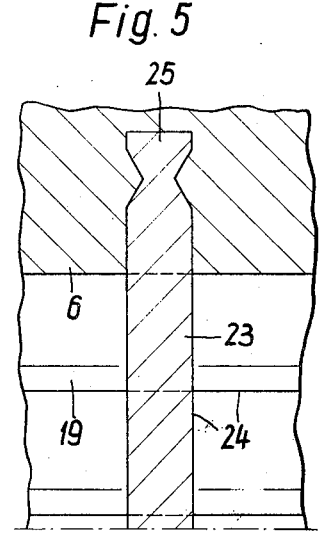
Inventor:
Horst Schibisch
ATTORNEYS

United States Patent Office 3,504,644
Patented Apr. 7, 1970

3,504,644
BULLETPROOF GRATING FOR ARMORED VEHICLE AIR INTAKE AND DISCHARGE OPENINGS
Horst Schibisch, Kornwestheim, Wurttemberg, Germany, assignor to Firma Dr. Ing. h.c.F. Porsche KG., Stuttgart-Zuffenhausen, Germany
Filed Jan. 10, 1968, Ser. No. 696,923
Claims priority, application Germany, Feb. 11, 1967, 1,578,345
Int. Cl. E06b 9/02
U.S. Cl. 109—49.5                                    10 Claims

ABSTRACT OF THE DISCLOSURE

A bulletproof closure for air intake and exhaust openings of armored vehicles, having a plurality of rows of profile bars, which are staggered in relation to each other and arranged in the direction of air flow. The outer row of profiled bars is detachably secured to the vehicle by means of a frame for easy removal in the field once they have been damaged.

BACKGROUND OF THE INVENTION

It is known in the prior art to provide gratings for the bulletproof closure of air passage openings in armored vehicles. For assembly, gratings are usually constructed as complete castings or welding assemblies that are inserted in front of the opening in the armored vehicle hull. This construction produces heavy and bulky assemblies. After bombardment, the outside of the profile bars will be partially crushed to increase the resistance to the passage of air so that there will be a danger of over heating the engine compartment. For repairing the damage, it is usually necessary to tow the vehicle away and the entire grating must be exchanged, which is costly and time-consuming.

SUMMARY OF THE INVENTION

It is an object of the present invention to construct a grating that is safer against bombardment, and which may be restored into operable condition by simple means after considerable bombardment. A further object is to reduce the repair cost as much as possible.

According to the present invention, the outside profile bars are fastened to a frame that is in turn detachably fastened in front of the inside profile bars that are securely attached to the vehicle body. By this simple construction, a damaged vehicle may be returned to duty in a short time merely by exchanging a single row of profile bars. Preferably, the outside profile bars fastened to the removable frame have a cross sectional area that is larger than the cross sectional area of the inside profile bars attached to the vehicle body so that the normally contradictory requirements of thin profiled bars for unobstructed air flow and heavy profile bars for decomposing the projectiles directly at the outside will be best fulfilled. The profile bars of large cross sectional area are provided with a smooth outer surface and the outer surface of the adjacent inside profile bars are provided with a sawtoothed surface, in transverse cross section, so that portions of the decomposed projectiles will be deflected towards the outside and will not penetrate further into the inside of the power plant. The outside profile bars in the frame and the inside profile bars in the vehicle body flow passage are provided with vertically arranged support struts to rigidly hold them in a lattice assembly, with the ends of the support struts being form lockingly attached, by means of dovetail joints or the like, to the frame and the vehicle body respectively. The profile bars and their corresponding support struts advantageously form a lattice assembly the ends of which are surrounded by the frame and adjacent portions of the vehicle body, respectively. In this manner, it is possible to match the grating shape to complicated shapes of the vehicle hull.

BRIEF DESCRIPTION OF THE DRAWING

Further objects, features and advantages of the present invention will become more clear from the following detailed description of the drawing, in which:
FIGURE 3 is a view of the grating taken in the direction of arrow R in FIGURE 2;
FIGURE 4 is a partial cross sectional view taken along line IV—IV of FIGURE 3;
and
FIGURE 5 is a partial cross sectional view taken along line V—V of FIGURE 2.

DETAILED DESCRIPTION OF THE DRAWING

Figure 1:
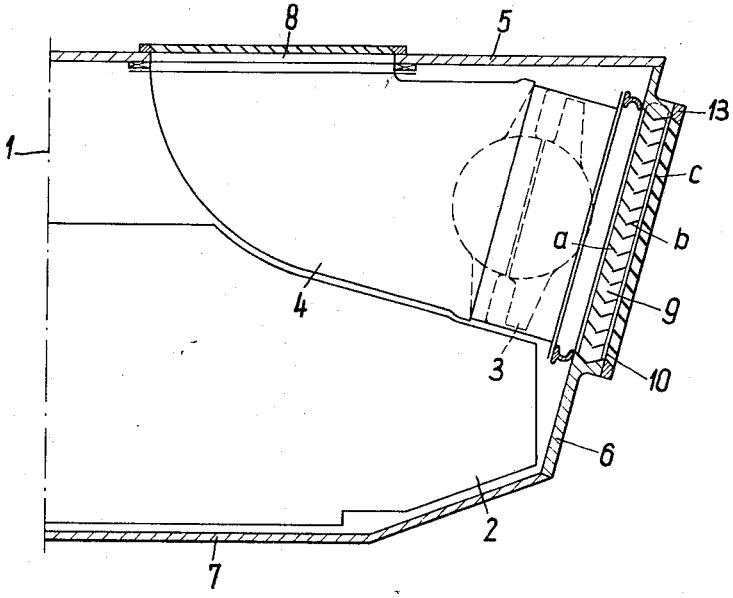
FIGURE 1 is a cross sectional view through the power plant of an armored vehicle, including the bulletproof covering of the cooling duct according to the present invention.
Figure 2:
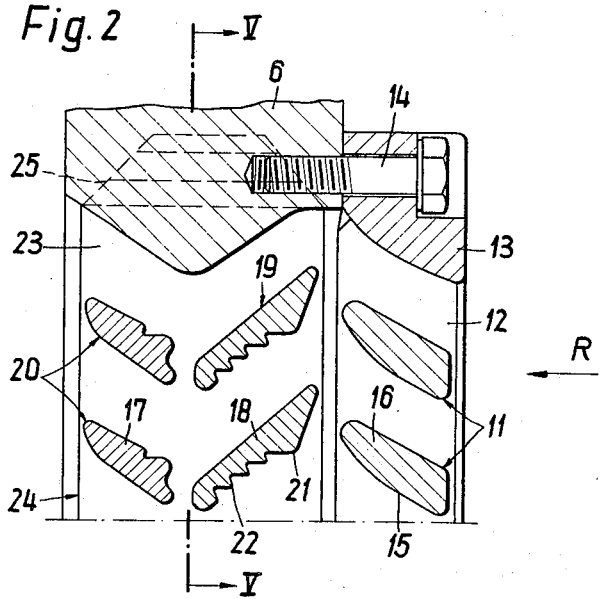
FIGURE 2 is an enlarged cross sectional view of a portion shown in FIGURE 1.

The grating of the present invention may be provided with armored vehicles of widely varying construction; therefore, only the portions of an armored vehicle necessary for understanding the present invention have been shown in the drawing. The power plant compartment 1 houses the drive mechanism 2 of the armored vehicle. The power plant cooling is accomplished by means of a cooling blower 3 arranged in a cooling duct 4 that houses a heat exchanger, not shown in detail, for the cooling water of the engine. The cooling duct 4 extends between the top side 5 and the rear wall 6 of the tub-shaped vehicle body 7. Cooling air is drawn in by the blower 3 through an inlet opening 8 at the top side 5 and flows through an outlet opening 9, provided in rear wall 6, to the atmosphere.

Inside profile bar rows *a* and *b* have adjacent pairs of profile bars angularly arranged with respect to each other in an upwardly oriented V-shape in the flow passage 9. At the outside 10 of the opening 9, a profile bar row *c* is arranged to form a bulletproof protective grating along with the other rows of profile bars. The row *c* consists of superimposed profile bars or rods 11 that are rigidly held together by means of support struts 12 that are attached to a frame 13, which frame is removably attached to the rear wall 6 by means of bolts 14. The profile bars 11 are provided with an uncreviced or smooth outer surface 9 and a cross sectional area 16 that is considerably larger than the cross sectional area 17 or 18, respectively, of the inside profile bars 19 and 20 of rows *a* and *b*. The outside surface 21 of the profile bars 19 is provided with saw teeth 22, in transverse cross section. The profile bars 19 and 20 are held in supports 23, which are arranged spaced with respect to each other. The support struts 23 and the profile bars 19 and 20 are connected to each other by welding and form an assembly 24 having ends 25 surrounded by the mass of the rear wall 6, preferably with a dovetail connection. The profile bars 11 together with the corresponding support struts 12 are similarly combined to provide a lattice-shaped or grate-shaped body, with the ends 26 surrounded by the frame 13. The inlet opening 8, which is less exposed to bombardment, on the upper side 5 of the vehicle may be covered with a simple grating that has a construction substantially identical to the frame 13.

During bombardment of the vehicle, the impinging projectiles will be decomposed at the strong profile bars 11. Portions of the projectiles which penetrate further will hit the saw teeth 22 of the profile bars 19 so that they will be deflected from there in the direction of the discharge opening 10. The smaller particles that may still penetrate inwardly will be prevented from entering the cooling duct 4 by the profile bars 20. If the profile bar row c is deformed to such an extent that the flow of cooling air is appreciably impaired, it is only necessary to remove the bolts 14 for exchange of the frame 13, which repair may be accomplished by a recovery vehicle in the area of action without difficulty, quickly and without towing the armored vehicle to a safer area. Therefore, the vehicle may be made operational again after a short overhaul.

While a preferred embodiment of the present invention has been shown in detail for puurposes of illustration, further modifications, variations and embodiments are contemplated without departing from the spirit and scope of the present invention.

I claim:

1. A grating for the bulletproof covering of gas intake and exhaust openings for armored vehicles comprising an outside frame having means for readily detachably connecting it to the exterior of one of the openings; a row of outside profile bars secured to said frame; a row of inside profile bars secured separate from said frame to said vehicle inwardly of and staggered in relation to said first mentioned row of profile bars, wherein said first profile bars have a cross sectional area that is substantially larger than the corresponding cross sectional area of said second profile bars.

2. The grating according to claim 1, wherein said first profile bars have surfaces facing the outside of said opening that are smooth and uninterrupted; said second profile bars having surfaces facing the outside of said opening that have a generally saw-tooth transverse cross sectional configuration.

3. The grating according to claim 2, including vertically arranged support struts rigidly interconnecting said first profile bars and having outwardly expanding tongues interengaged in correspondingly shaped outwardly expanding grooves in said frame; second support struts rigidly interconnecting said second profile bars and having at their outer ends outwardly enlarged tongues interengaged into correspondingly outwardly enlarged grooves in said vehicle body.

4. The grating according to claim 3, wherein said first profile bars and their respective support struts form a lattice assembly having their outer ends surrounded by said frame, and said second profile bars and respective second support struts form a lattice assembly having their outer ends surrounded by the adjacent portion of the vehicle body.

5. The grating according to claim 4, including a third row of profile bars spaced inwardly in the direction of fluid flow from said second row of profile bars and being parallel with respect to said first and second rows of profile bars; said second and third rows of profile bars forming horizontally aligned pairs of profile bars, each pair arranged in an upwardly opening V-shape in transverse cross section; each profile bar of said first row of profile bars being substantially horizontally aligned with respect to said third row of profile bars with each profile bar of said first row of profile bars being substantially parallel in transverse cross sectional shape to the corresponding profile bars in said third row of profile bars.

6. The grating according to claim 1, including vertically arranged support struts rigidly interconnecting said first profile bars and having outwardly expanding tongues interengaged in correspondingly shaped outwardly expanding grooves in said frame, second support struts rigidly interconnecting said second profile bars and having at their outer ends outwardly enlarged tongues interengaged into correspondingly outwardly enlarged grooves in said vehicle body.

7. The grating according to claim 6, wherein said first profile bars and their respective support struts form a lattice assembly having their outer ends surrounded by said frame, and said second profile bars and respective second support struts form a lattice assembly having their outer ends surrounded by the adjacent portion of the vehicle body.

8. A grating for the bulletproof covering of gas intake and exhaust openings for armored vehicles comprising an outside frame having means for readily detachably connecting it to the exterior of one of the openings; a row of outside profile bars secured to said frame; a row of inside profile bars secured separate from said frame to said vehicle inwardly of and staggered in relation to said first mentioned row of profile bars, including vertically arranged support struts rigidly interconnecting said first profile bars and having outwardly expanding tongues interengaged in correspondingly shaped outwardly expanding grooves in said frame; second support struts rigidly interconnecting said second profile bars and having at their outer ends outwardly enlarged tongues interengaged into correspondingly outwardly enlarged grooves in said vehicle body.

9. The grating according to claim 8, wherein said first profile bars and their respective support struts form a lattice assembly having their outer ends surrounded by said frame, and said second profile bars and respective second support struts form a lattice assembly having their outer ends surrounded by the adjacent portion of the vehicle body.

10. A grating for the bulletproof covering of gas intake and exhaust openings for armored vehicles comprising an outside frame having means for readily detachably connecting it to the exterior of one of the openings; a row of outside profile bars secured to said frame; a row of inside profile bars secured separate from said frame to said vehicle inwardly of and staggered in relation to said first mentioned row of profile bars, wherein said first profile bars have surfaces facing the outside of said opening that are smooth and uninterrupted; said second profile bars having surfaces facing the outside of said opening that have a generally saw-tooth transverse cross sectional configuration.

References Cited

UNITED STATES PATENTS

| | | | |
|---|---|---|---|
| 1,736,621 | 11/1929 | Platt | 109—58.5 |
| 1,911,408 | 5/1933 | Toney | 109—58.5 |
| 2,361,186 | 10/1944 | Fishbein et al. | 98—121 |
| 2,364,271 | 12/1944 | Carver | 98—121 |

FOREIGN PATENTS

| | | |
|---|---|---|
| 756,033 | 5/1953 | Germany. |
| 1,012,492 | 4/1952 | France. |

REINALDO P. MACHADO, Primary Examiner

U.S. Cl. X.R.

98—121